No. 871,623. PATENTED NOV. 19, 1907.
C. E. PHILLIPS.
VEHICLE RUNNING AND PROPELLING GEAR.
APPLICATION FILED MAR. 20, 1907.
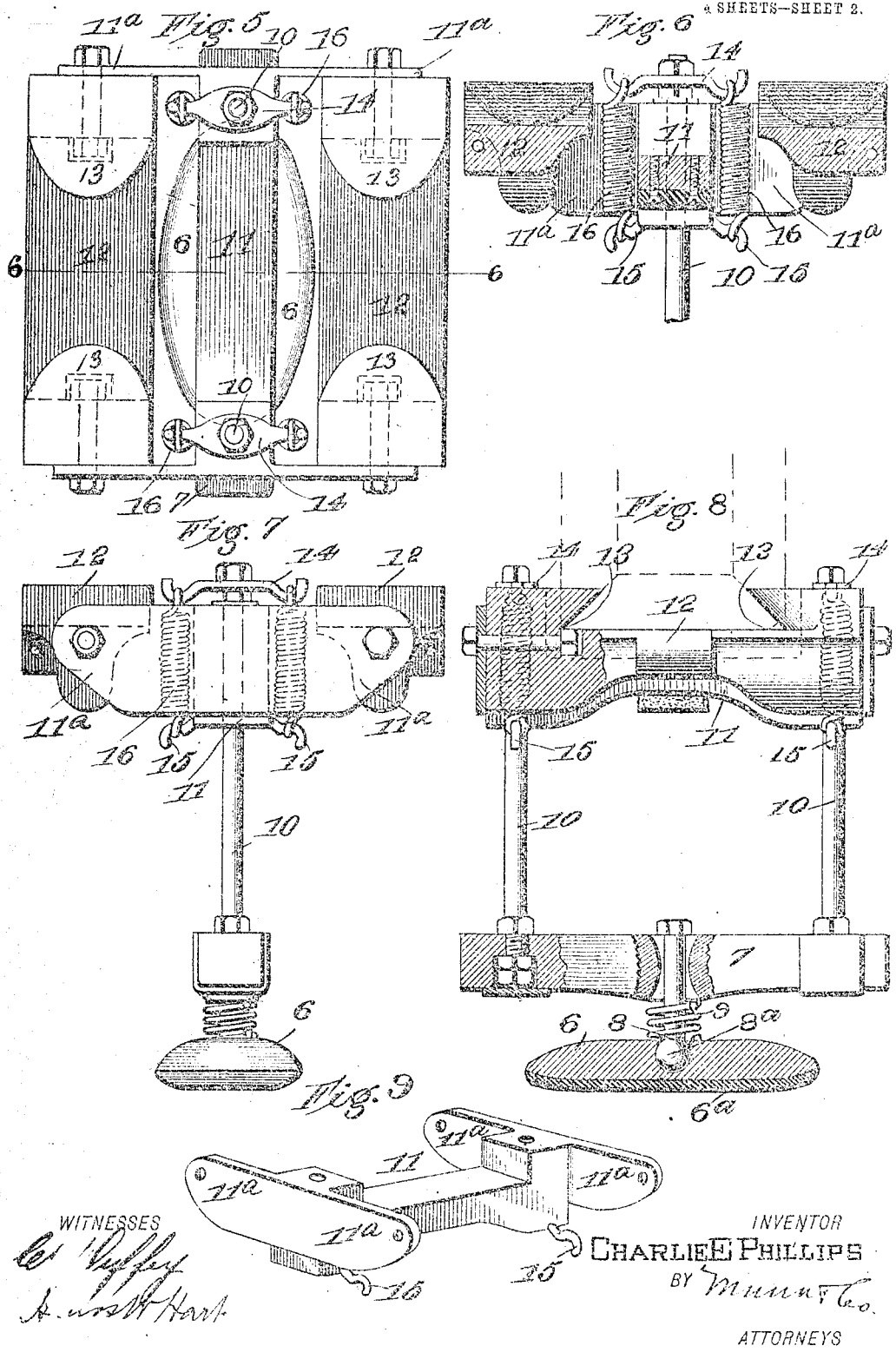
WITNESSES
INVENTOR
CHARLIE E. PHILLIPS
BY Munn & Co.
ATTORNEYS No. 871,623. PATENTED NOV. 19, 1907.
C. E. PHILLIPS.
VEHICLE RUNNING AND PROPELLING GEAR.
APPLICATION FILED MAR. 20, 1907.
4 SHEETS—SHEET 3
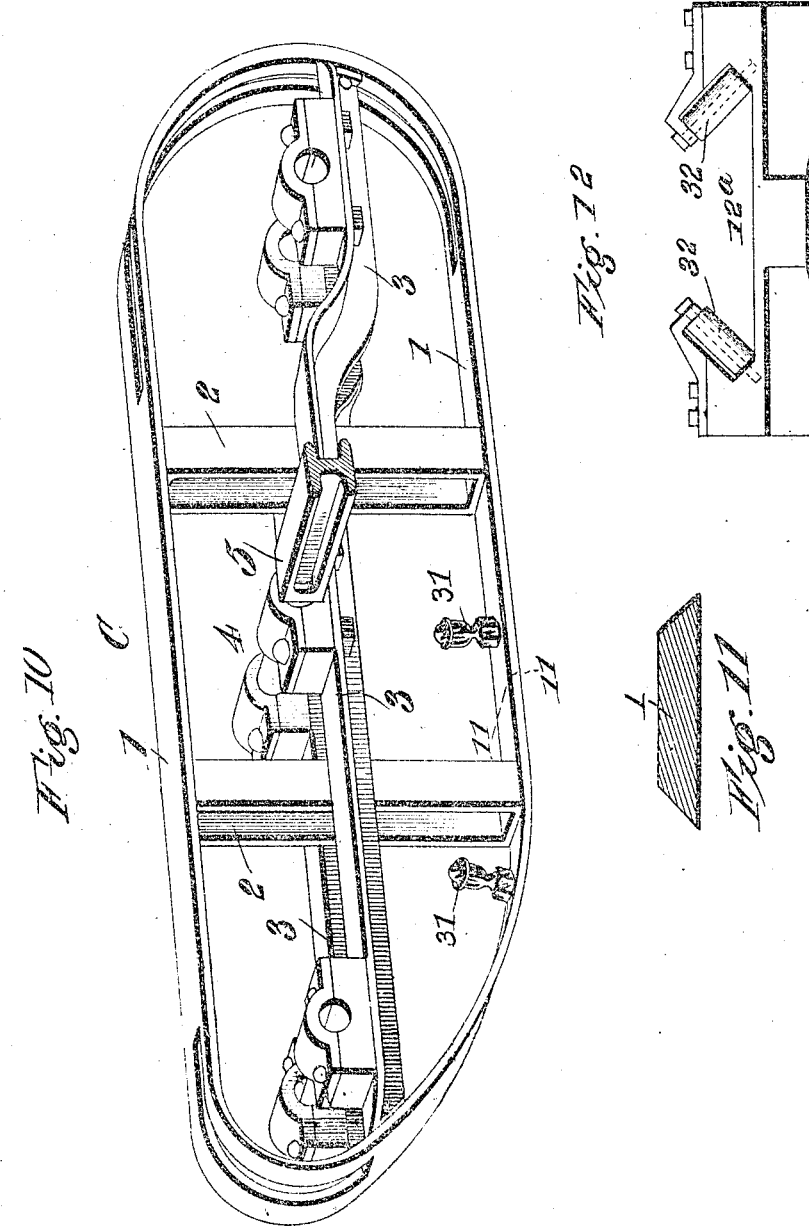
WITNESSES
INVENTOR
Charlie E Phillips
BY
ATTORNEYS No. 871,623. PATENTED NOV. 19, 1907.
C. E. PHILLIPS.
VEHICLE RUNNING AND PROPELLING GEAR.
APPLICATION FILED MAR. 20, 1907.

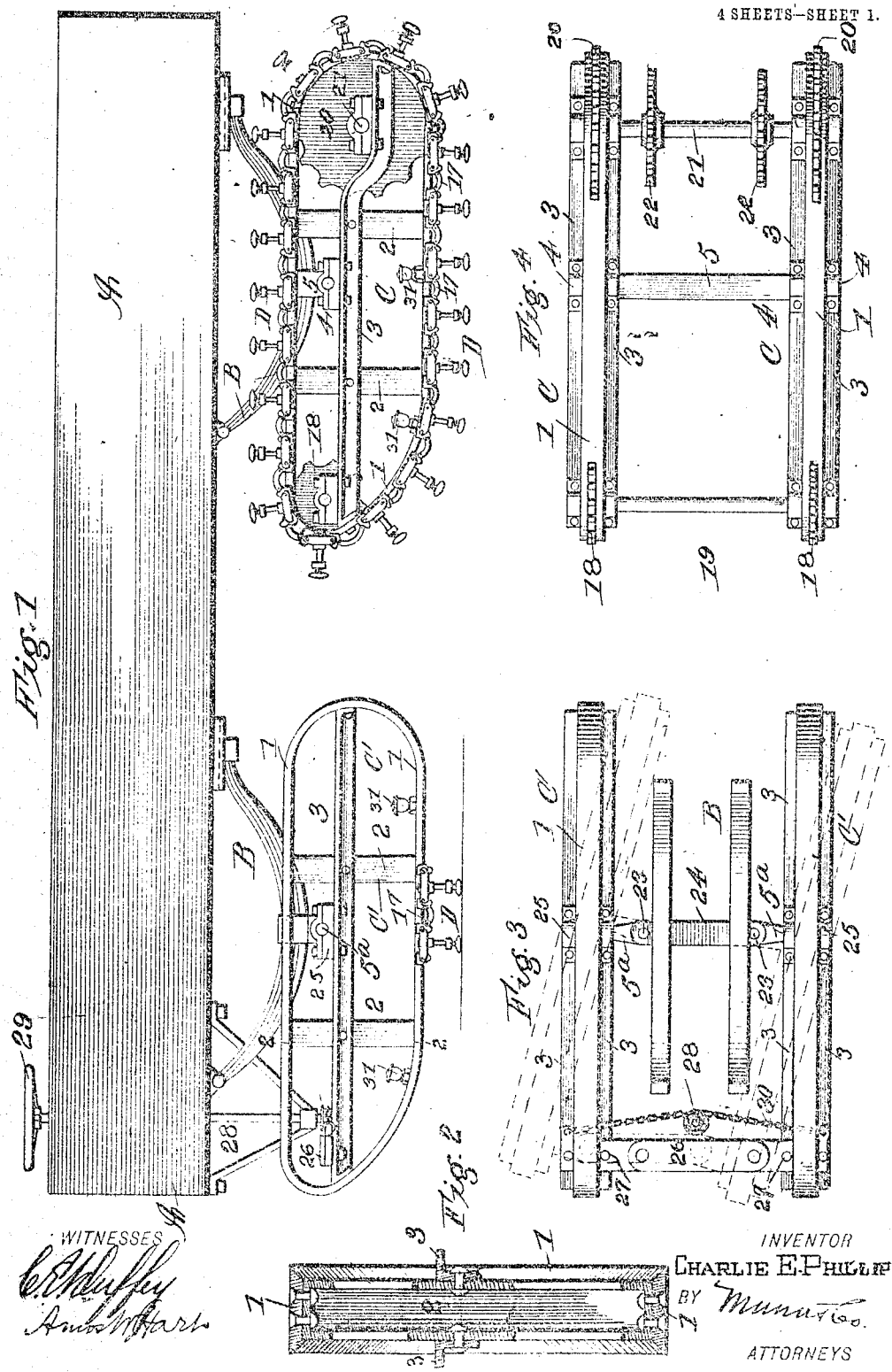

4 SHEETS—SHEET 4.

WITNESSES
C. R. Duffey
Amos W. Hart

INVENTOR
Charlie E. Phillips
BY Munn & Co.
ATTORNEYS

UNITED STATES PATENT OFFICE.

CHARLIE E. PHILLIPS, OF BREMERTON, WASHINGTON.

VEHICLE RUNNING AND PROPELLING GEAR.

No. 871,623.   Specification of Letters Patent.   Patented Nov. 19, 1907.

Application filed March 20, 1907. Serial No. 363,375.

*To all whom it may concern:*

Be it known that I, CHARLIE ELBRIDGE PHILLIPS, a citizen of the United States, and resident of Bremerton, in the county of Kitsap and State of Washington, have invented an Improvement in Vehicle Running and Propelling Gears, of which the following is a specification.

My invention is an improved substitute for ordinary wheels and axles of vehicles and is particularly adapted for traction engines, automobiles, and other heavy vehicles, and for use on soft, sandy or rough roads.

A principal feature of my invention is an endless track composed of a series of feet or devices adapted for contact with the ground or other surface for supporting the vehicle, and also effecting propulsion, such feet or bearers being flexibly connected and traveling around elongated horizontal frames of approximately oval form, the said frames being arranged in pairs in front and rear beneath the vehicle body.

Figure 13:
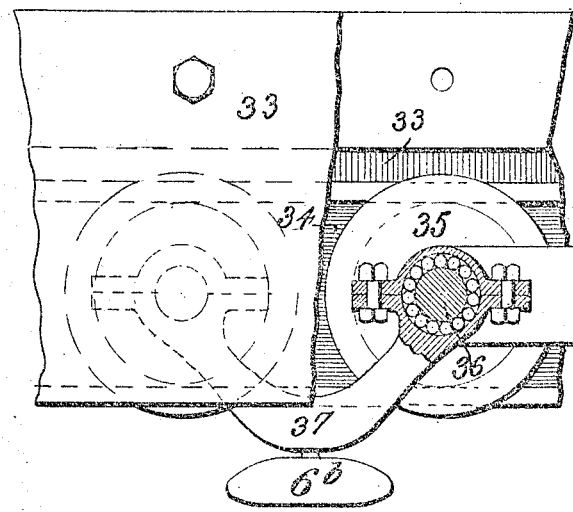
Figure 14:
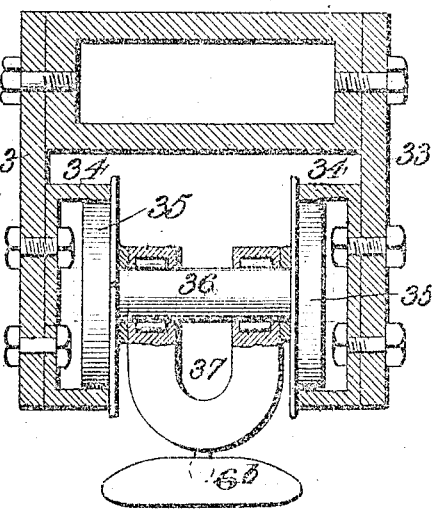
Figure 15:
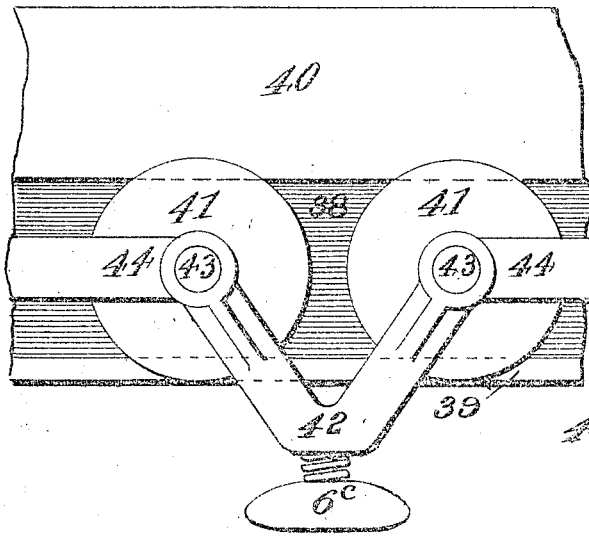
Figure 16:
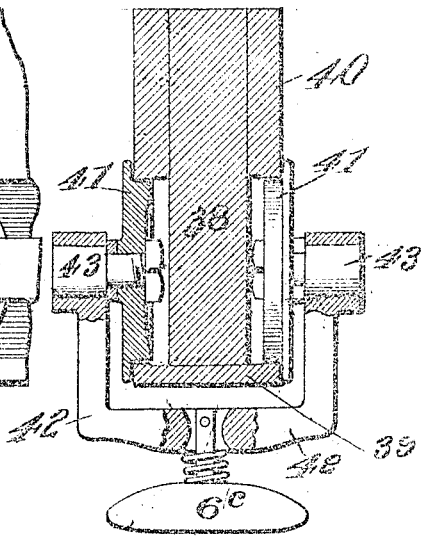

My invention also comprises various other features as will be hereinafter described. The invention is illustrated in the accompanying drawings, in which Figure 1 is a side view showing my improved running gear applied to a vehicle body. Fig. 2 is an enlarged vertical cross section on the line 2—2 of Fig. 1, the feet or bearers that work in contact with the ground or other surface being omitted. Fig. 3 is a plan view of the front running gear minus the feet or bearers that travel on the ground. Fig. 4 is a similar plan view of the rear running gear, the feet being omitted as before. Fig. 5 is a plan view of a bearer or foot constituting one of the series of devices which are flexibly connected and adapted to travel around the horizontal oval frames. Fig. 6 is a vertical section on the line 6—6 of Fig. 5. Fig. 7 is a side view of the parts shown in Figs. 5 and 6. Fig. 8 is mainly a central vertical cross section of the parts shown in Figs. 5 to 7. Fig. 9 is a perspective view of the central upper portion of the frame of a foot or bearer. Fig. 10 is a perspective view of one of the elongated frames to which the endless traveling track is applied. Fig. 11 is an enlarged cross section on the line 11—11 of Fig. 10. Fig. 12 is a view of a modification in the connection between the units or bearers of the endless track and the frame on which it travels. Fig. 13 is in part a side view and in part a section of another modification. Fig. 14 is a vertical transverse section of the parts shown in Fig. 13. Fig. 15 is a side view of another modification. Fig. 16 is a transverse section of the same.

Referring in the first instance to Fig. 1, A indicates the body of a vehicle, and B curved or semi-elliptic springs attached to the under side thereof. To the central portions of these springs are attached parts composing my improved running gear.

I will first describe the rear running gear. It is formed chiefly of two frames C and an endless track traveling thereon. The frame— see particularly Fig. 10—is elongated and in use extended horizontally and so constructed as to present in side view a form approximating the well known shape of bob-sled runners. The exterior portion of the frame is an endless rim 1, which is thickened or extends laterally, and also, as shown in Fig. 2, is beveled on its inner side. This rim is connected transversely by vertical bars 2 and longitudinal bars 3. The two vertical bars are separated and spaced equidistantly from the longitudinal center of the frame. Each is formed of two side portions as shown in Fig. 2, and to these the two parallel side bars 3 are riveted. The side bars are formed of angle iron, and to their middle portions between the transverse bars 2 are secured the bearings 4 of an axle 5, which is suitably attached to the central lower portions of the semi-elliptic springs B. Thus each of the horizontal frames C is adapted to rock on the axle in vertical planes so that their under sides conform in respect to inclination with the surface over which the vehicle travels. The endless track D which travels on and around each of the horizontal parallel frames C, is composed of a series of units which are identical in form and construction and flexibly connected as well as attached to the rim 1 so as to slide easily thereon.

Referring particularly to Figs. 5–8, 6 indicates a foot proper, or that portion which bears directly upon the ground or other surface over which the vehicle travels. The same is elongated in a transverse direction, and provided on its under side with a rubber cushion $6^a$. It is connected with a bar 7 constituting part of a frame, by an elastic and universal joint, the same being formed of a bolt 8 that passes through a slot in the bar 7, and has a spherical head $8^a$ which is held in a corresponding socket formed in the upper side of the foot proper 6. A spiral spring 9 encircles the bolt and presses upon the foot so as to hold it spaced from the bar 7 but prevent its rotation. It is obvious that by this construction the foot 6 is adapted to assume different angles corresponding to the particular inclination of the portion of the ground or other surface upon which it rests as the vehicle advances, and that the spring provides an elastic bearing, which enables the foot proper to yield or rise vertically when subjected to unusual pressure. In such case the bolt 8 slides in its bearing in the bar 7. The latter is attached by nuts to two parallel rods 10 which pass through bores in the enlarged ends of a frame or bar 11—see Fig. 9. This bar 11 is not connected directly with the rim 1 of the horizontal frames C, but indirectly by the means now to be described. The end portions of the bar 11 which is constructed of iron or other suitable metal, are extended laterally, forming what may be termed wings 11ª—see Fig. 9—and between the ends of these are pivoted transverse bars or blocks 12 which are provided with claws 13 that overlap and thus engage the beveled edges of the rim 1. Thus, as illustrated in Fig. 8, a sliding dove-tail connection is formed between the parts 12, 13, and the rim 1. The claws are rounded as indicated, for the purpose of reducing friction between them and the rim, and for allowing a certain freedom of adjustment of each of the units or bearers on the rim as they travel around it.

In addition to the spring support afforded in connection with the foot 6, I provide a still more elastic support in connection with the upper portion of the bearer by the following means. A plate 14 having its ends constructed as hooks projecting upward, is secured by nuts upon the upper end of the rods 10, and hooks 15 are also provided on the lower sides of the bars 11—see Fig. 9. Spiral springs 16 connect the hooked plates or bars 14 with the hooks 15, and since the bars 11 are free to slide on the rods 10, and the weight is imposed thereon through the medium of the bars 12, it is apparent that the springs will yield and become elongated more or less according to the weight imposed on them and to the roughness of the surface over which the vehicle passes. The several units or bearers are connected with each other by two curved links 17, thus forming an endless chain of bearers which constitutes an endless track adapted to travel around the frame C, or more particularly around the rim thereof. The rim is made of such width that the units or bearers are duly supported when the vehicle is inclined sidewise more or less.

To relieve friction at the front end of the frames C, I provide sprocket wheels 18 at that point and mount them upon a connecting shaft 19—see Figs. 1 and 4. The bearings of the shaft are fixed and secured upon the front ends of the longitudinal frame bars 3. The rim 1 is slotted to allow the due projection of the peripheries of the sprocket 18 therethrough. For propelling the vehicle, I arrange larger sprocket wheels 20 at the rear ends of the parallel frames C, the same being secured to a transverse axle 21 whose bearings are secured upon the dropped down rear portions of the longitudinal bars 3. The rear end portions of the rims 1, are slotted to allow due projection of the peripheries of the sprocket wheels 20 therethrough, as will be readily understood. I propose in practice, to drive the sprocket wheels by connecting them with any preferred form of motor which will be carried on or form an attachment of the body A of the vehicle. In this instance, I show—see Fig. 4—sprocket wheels 22 mounted on the axle 21, and with these a motor may be connected by chains in a well understood manner. In practice, also, one of the sprocket wheels 20 will be mounted loose on the axle 21 and operatively connected therewith by means of a ratchet wheel and pawl according to a well known expedient adopted in traction engines, harvesters, etc.

The front running gear is constructed in the main similar to the rear running gear, save in the absence of propelling media, and of the front sprocket wheels 18; in other words, of two frames C' spaced apart and comprising a beveled rim 1ª, vertical cross bars, longitudinal bars 3, and a series of bearers forming an endless track adapted to travel around the beveled rim 1ª. In place of an axle similar to the rear one, I propose to employ two stub axles 5ª, which are pivoted at 23 to a bar 24 which is rigidly attached to the lower portion of the semi-elliptic springs B. The bearings 25 for such stub axles are secured upon the angle bars 3 in the same manner as the bearings of the rear axle 5. The front ends of the two parallel frames C' are connected by a link 26 whose ends are pivoted to ears or short bars 27 riveted to the front ends of angle bars 3. It will now be apparent that while the springs B are held rigidly in their longitudinal relation to the body A of the vehicle, the two frames C' with their endless traveling tracks may be turned laterally in either direction, on the pivots 23 of the stub axles, as indicated by dotted lines Fig. 3, and without changing their parallelism to each other. I propose to employ any preferred means for turning the frames C' thus to the right or left as required for steering the vehicle, but I show for this purpose a vertical rotatable shaft 28—see Figs. 1 and 3—the same having a hand wheel 29 and its lower end connected by a chain 30 with the ends of the two opposite frames C'. It is obvious that by rotating the shaft 28 the chain will be taken up on one side and paid out on the other, and the frames C' thereby shifted right or left as the case may be.

The rods 10 forming part of the frame of the units or bearers D, may be made of various lengths. Thus the lower bar 7 to which the feet proper 6 are attached, may be placed close to the upper portion or frame bar 11 of the bearers, instead of being spaced therefrom to the extent indicated in the drawings.

In practice, oil cups 31—see Fig. 10—will be applied to the lower side of the rims of the respective frames C, C', so as to effectively lubricate the parts and enable the units or bearers to slide on the rim with minimum friction and wear.

In Fig. 12, I show a modification of the upper portion of a bearer or unit of the endless track, in which in place of the projections or claws 13 shown in Figs. 5, 6 and 8, I apply rollers 32, the same being arranged in inclined position and journaled on the cross bar 12$^a$. In Figs. 13 and 14, I show another modification of the elongated guide frame, in which wheels are employed. In this instance, instead of employing a beveled rim 1, as before described, the rim of the oblong frame C$^2$ is formed of two side bars 33 which are arranged parallel, and to the sides of the same are secured channel bars 34, and between the flanges of such bars, wheels 35 are arranged to travel. It is obvious that the upper flange of the parts 34 will constitute the bearing for the wheels, which are arranged parallel and connected by an axle 36 to which a U-shaped bar 37 is applied and duly connected with a foot 6$^b$. The lower flanges of the parts 34 serve merely to retain the wheels in place.

In Figs. 15 and 16, I show still another modification, in which the guide frame C$^3$ has a central pendent portion 38 provided on its rim with flanges 39 between which and shoulders 40, flanged wheels 41 are arranged to travel. The bearing is against the shoulders 40 and the flanges 39 serve merely to hold the wheels in place. A foot 6$^c$ is connected with a forked frame or bar 42 which is suitably mounted on the stub axles 43 of the wheels 41. Links 44—see Fig. 15—connect the several forked frames 42 flexibly, in the same manner as the links 17 connect the units or bearers of the endless track D before described.

By the construction of the frames C, C', in the manner described, they combine maximum lightness, strength and rigidity. The springs forming part of the flexibly connected units or bearers composing the traveling tracks, provide an elastic yielding support for the body of the vehicle, and the length of the under side of the frames C, C', furnishes an extended bearing so that several of the feet or bearers proper always rest on the ground simultaneously, which is a feature of obvious importance. The combined frames and endless track applied slidably thereto, constitute what may be termed runners having a movable friction side or surface for contact with the ground. It is apparent that the endless tracks applied to the front frames C', travel on the rims 1$^a$ of said frames by reason of contact with the ground or other surface. In other words, the endless tracks applied to such frames are caused to travel by the propulsive means applied to the rear frame C, and their endless tracks.

I thus produce a running gear which is particularly adapted for transportation of heavy objects with minimum power and practically without jar over rough, sandy or muddy roads.

I claim:

1. An improved vehicle gearing comprising a rigid guide frame arranged in a vertical plane and having a thickened rim as specified, and an endless track comprising a series of units which are flexibly connected and provided with parts adapted for contact with the ground, and with devices which overlap the inner edge of the aforesaid rim, whereby said units are held in place on the frame and adapted to slide thereon in the manner specified.

2. In a vehicle gearing of the class indicated, the combination with a guide frame arranged in a vertical plane and having a rim which is beveled on the inner side, of an endless track composed of a series of units including parts adapted for contact with the ground and having on the upper sides inwardly projected and undercut portions which embrace the angular side edges of the rim of the frame, substantially as described.

3. The combination with a frame arranged in a vertical plane and having a rim composed of a metal bar having its side edges beveled, and an endless track composed of a series of units each of which consists of a top frame and a foot or bearer for contact with the ground, the said top frame comprising two bars which are spaced apart and each provided with opposite inwardly projecting claws adapted to engage the beveled edges of the aforesaid rim, and which are rounded on their inner sides, as and for the purpose specified.

4. The combination with a frame arranged in a vertical plane, of an endless track composed of a series of units, which include a frame that is slidably connected with the vertical frame and includes a foot or bearing proper for contact with the ground, and a spring bearing for such foot which permits it to oscillate vertically, substantially as described.

5. In a vehicle gearing, a bearer composing a part of an endless traveling track, the same consisting of an upper portion adapted for attachment to a guide and for sliding contact therewith, and a lower portion consisting of a bar having a vertical slot, a foot adapted for contact with the ground, a bolt arranged in the aforesaid slot and connected with the foot by a universal joint, and a spring interposed between the said bar and foot, as shown and described.

6. In a vehicle gearing of the class indicated, the combination with a guide frame, arranged in a vertical plane, and an endless traveling track composed of a series of flexibly connected units, having a foot for contact with the ground, and on its upper side provided with means for connecting it slidably with the guide frame, a supplemental or lower frame adapted to slide vertically in the upper frame, and springs which support the upper frame upon the lower one, substantially as described.

7. In a vehicle gearing of the class indicated, an improved slidable bearer comprising an upper frame, a lower frame adapted to slide vertically therein, springs connecting the two frames, the lower frame having a foot for contact with the ground, substantially as described.

8. In a vehicle gearing of the class indicated, the combination with a vertical guide frame, of an endless track composed of a series of units which are flexibly connected, and comprising a lower frame having a foot for contact with the ground, an upper frame consisting of a central transverse bar, having laterally extended wings arranged parallel and opposite each other, bars pivoted between the extremities of such wings and having claws for engaging the rim of the frame, substantially as described.

9. In a vehicle gearing of the class indicated, the combination with a frame having an internally beveled rim, of an endless track composed of a series of flexibly connected parts including a foot for bearing on the ground, and an upper frame including two parallel bars having on their upper sides inwardly projecting parts adapted for movable contact with the rim of the guide frame, said bars being pivoted in the upper frame so as to oscillate and adapt them to pass around the frame in the manner described.

10. The combination with a frame, comprising a rim and internal braces therein, the rim being provided with slots, and sprocket wheels journaled in the frame and their peripheral portions projecting through the said slots, an endless traveling track composed of a series of units provided with feet or bearers for contact with the ground, and constituting a flexible chain which is slidably connected with the periphery of the frame and passes at one end of the latter over the sprocket wheel, as shown and described.

11. The combination with a vehicle body, of guide frames arranged in parallel position vertically and spaced apart, stub axles which are jointed to a part connected with the body of the vehicle, and journaled in boxes secured to the central portions of the said frames, means for flexibly connecting the front ends of the two frames, and means for shifting the said frames laterally as required for guiding the vehicle, the frames being held parallel in any adjustment, substantially as described.

12. The combination with a vehicle body, of parallel frames held in vertical planes and spaced apart, and comprising rigid metal rims and a brace and tie bar arranged longitudinally and composed of angle iron, bearings attached to the upper flange of such iron, and an axle journaled in said bearings and connected with the body of the vehicle, substantially as described.

CHARLIE E. PHILLIPS.

Witnesses:
SOLON C. KEMON,
AMOS W. HART.